United States Patent [11] 3,594,021

| [72] | Inventor | Robert M. Williams Davison, Mich. |
|---|---|---|
| [21] | Appl. No. | 6,261 |
| [22] | Filed | Jan. 27, 1970 |
| [45] | Patented | July 20, 1971 |
| [73] | Assignee | Genova Products Davison, Mich. |

[54] EXPANSION JOINT
  10 Claims, 3 Drawing Figs.
[52] U.S. Cl..................................................... 285/302, 285/93
[51] Int. Cl..................................................... F16l 27/12
[50] Field of Search........................................... 285/302, 93, 165, 224, 130; 138/104; 222/158, 159

[56] References Cited
UNITED STATES PATENTS
2,461,414  2/1949  Donner ....................... 285/93

2,786,696  3/1957  Feldmeier .................... 285/93 X
3,499,667  3/1970  Pfeuffer ...................... 285/93
3,504,383  4/1970  Young ........................ 285/302

Primary Examiner—Kenneth Downey
Assistant Examiner—Andrew V. Kundrat
Attorney—Olsen and Stephenson ABSTRACT: An expansion joint for thermoplastic piping for drain, waste and vent uses. The joint includes a movable piston or first sleeve telescoped into a transparent barrel or second sleeve. Position indicator means are located on the movable piston so as to be visible through the barrel and on the barrel to indicate the normal positions that should be maintained by the telescoped parts of the expansion joint.

PATENTED JUL 20 1971    3,594,021

INVENTOR
ROBERT M. WILLIAMS

BY *Olsen and Stephenson*
ATTORNEYS

EXPANSION JOINT

BACKGROUND OF THE INVENTION

The present invention relates to expansion joints for use in conjunction with thermoplastic piping for drain, waste and vent systems.

Much of the building that occurs today is multistory in nature, and, regardless of the material that is utilized, expansion joints are necessary in the plumbing systems. One of the biggest problems in the installation of expansion joints is the finding of a positive, error-free method of knowing exactly the position of the movable piston of the joint. In some instances, marks have been put on the exposed portion of the piston, but, as is understood by those skilled in the art, such practices have left much to be desired.

SUMMARY OF THE INVENTION

The present invention has overcome the shortcomings of the prior art and has provided an expansion joint wherein the barrel is made of a transparent material so that the exact location of the moving piston can easily be seen. This vastly simplifies proper installation of the expansion joint, and also provides the inspecting code official with the positive proof that the joint can perform its desired function.

According to one form of the present invention, an expansion joint is provided comprising a transparent barrel or first sleeve having an integral annular shoulder projecting radially inwardly from its inner surface at a location adjacent to the end thereof so as to provide an abutment against which piping can be seated and secured in place. A movable piston or second sleeve is telescoped into the first sleeve from the so end thereof for relative axial movement, and it has a bell flange at its outer end into which other piping can be seated and secured. The second sleeve is visible through the first sleeve so that during installation and thereafter when in use, the relative positions of the sleeves can readily be determined. Sealing means are provided between the two sleeves, and in the one form of the present invention, the sealing means comprise an O-ring mounted in a groove on the outer surface of the piston or second sleeve so as to be visible through the transparent barrel or first sleeve, thus also serving as a position indicator. It is also contemplated that additional indicia means will be located on the outer surface of the barrel or first sleeve so that during installation proper alignment of the two telescoped members of the expansion joint can more readily be made.

Thus, it is an object of the present invention to provide an improved expansion joint for piping.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
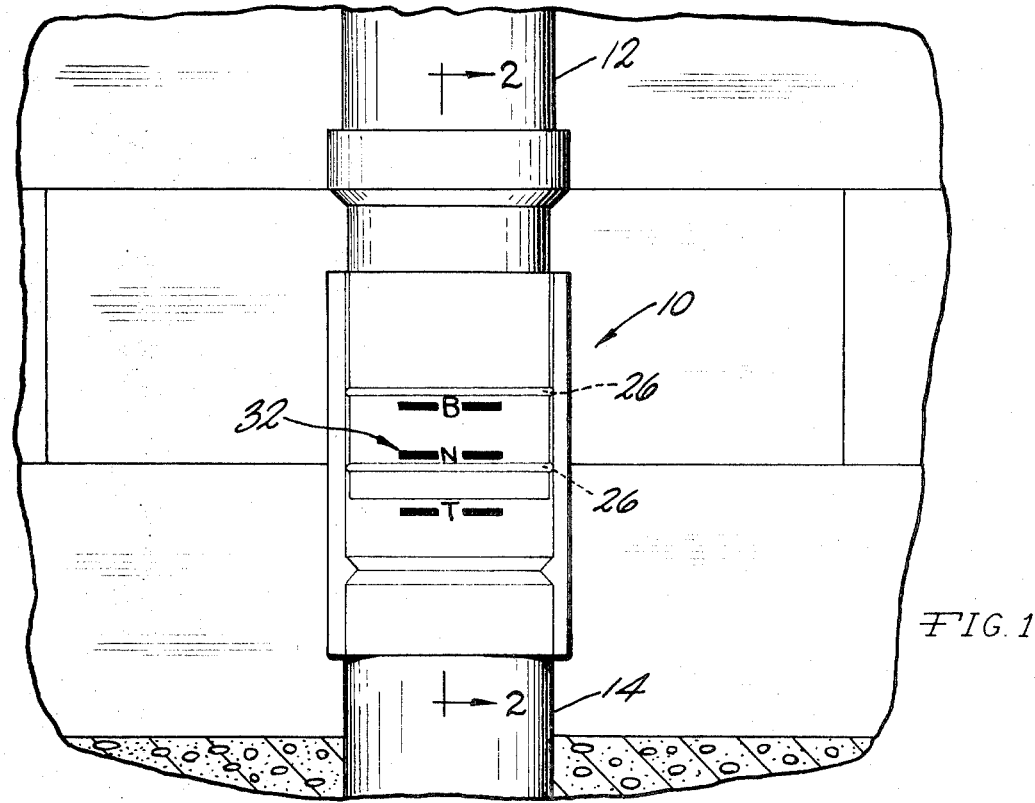
FIG. 1 is a fragmentary elevational view of a piping system which contains an expansion joint embodying the present invention.
Figure 2:
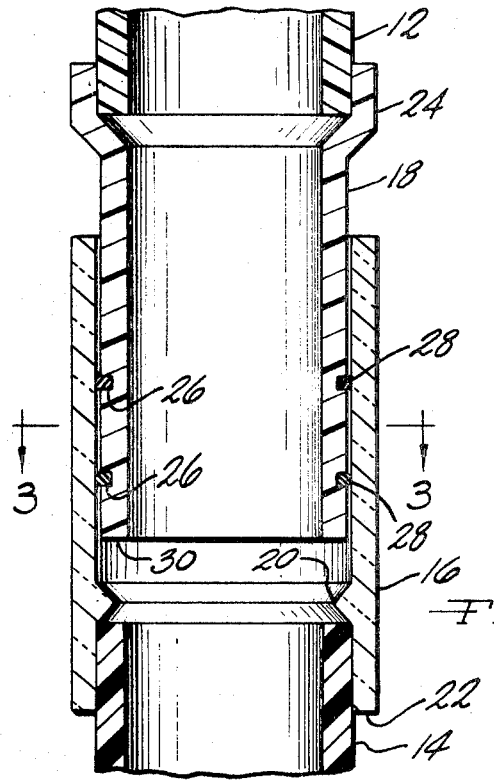
FIG. 2 is a vertical section taken on the lines 2-2 of FIG. 1 showing details of construction of the expansion joint.
Figure 3:
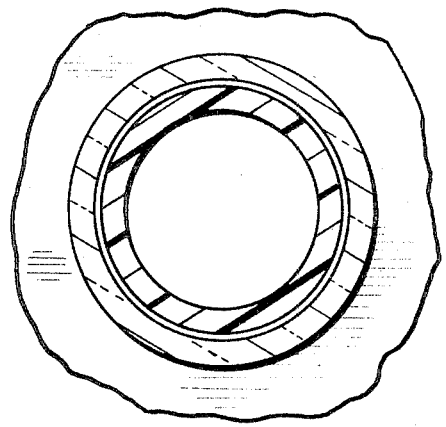
FIG. 3 is a section taken on the lines 3-3 of FIG. 2

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The expansion joint 10 is shown located between vertical piping 12 and 14 of a drain, waste or vent plumbing system. The piping 12 and 14 is made of suitable thermoplastic material.

The expansion joint 10 includes a barrel or first sleeve 16 into which is telescoped a piston or second sleeve 18. The first sleeve 16 is made of a suitable transparent vinyl plastic material so that the exact location of the moving piston or second sleeve 18 can easily be seen. The first sleeve 16 has an integral annular shoulder 20 projecting radially inward from its inner surface at a location adjacent to the one end 22 so as to provide an abutment against which the piping 14 can be seated when solvent welding the piping 14 to the inner surface of the sleeve 16.

The second sleeve or piston 18 has a bell flange 24 at its outer end which is adapted to receive the piping 12 for solvent welding the latter to the sleeve 18. The sleeve 18 also has annular grooves 26 around its periphery around which are seated O-rings 28 for providing a seal between the outer surface of the sleeve 18 and the inner surface of the sleeve 16 when the former is telescoped into the latter, as illustrated in the drawing.

The O-rings 28 serve not only as sealing means between the first and second sleeves 16 and 18, but they also function as position indicator means which are readily visible through the transparent sleeve 16 for showing the relative spacing of the one end 30 of sleeve 18 with respect to the annular shoulder 20. By virtue of this arrangement, the plumber when installing the piping system, will be able to determine quite readily the relative positions of the sleeves 16 and 18 so that he can be certain that the joint will be capable of expanding and retracting in the intended manner. Also, the inspection code official who normally will inspect the building in many areas of the country, will have positive proof that the joint is set to function in the desired manner.

To further facilitate the accurate positioning of the sleeves 16 and 18 relative to one another and to determine more readily after erection if the expansion joint is capable of functioning properly, it is also contemplated that the outer sleeve 16 will be provided with position indicator means 32 in the form if indicia such as the three parallel circumferential lines identified by the letters B, N, T. By virtue of this marking system, the limits between which the one O-ring can properly travel and the normal installation position between the two extremes can readily be identified.

I claim:

1. An expansion joint for piping comprising a transparent first sleeve having an integral annular shoulder projecting radially inward from its inner surface at a location adjacent to one end thereof so as to provide an abutment against which piping can be seated and secured in place, a second sleeve telescoped onto said first sleeve from the other end thereof for relative axial movement and having a bell flange at its outer end into which other piping can be seated and secured, said second sleeve being visible through said first sleeve so that during installation and thereafter in use the relative positions of the sleeves can readily be determined.

2. An expansion joint as is defined in claim 1, wherein sealing means are operatively positioned between the adjacent telescoped surfaces of said first sleeve and said second sleeve.

3. An expansion joint as is defined in claim 2, wherein said sealing means comprises at least one O-ring mounted in a groove in the outer surface of said second sleeve and in engagement with the inner surface of said first sleeve.

4. An expansion joint as is defined in claim 3, wherein indicia is located on said first sleeve between said annular shoulder and said other end thereof, said O-ring and said indicia being located on their respective sleeves so that when aligned said second sleeve will be axially spaced from said annular shoulder.

5. An expansion joint as is defined in claim 1, wherein first position indicator means are located on said first sleeve on the telescoped portion thereof so as to be visible externally thereof, and second position indicator means are located on said second sleeve on the telescoped portion thereof so as to be visible through said first sleeve for alignment with said first position indicator means during installation of the expansion joint in the piping.

6. An expansion joint as is defined in claim 5, wherein said second position indicator means is an O-ring mounted on said second sleeve and visible through said first sleeve.

7. An expansion joint as is defined in claim 6, wherein said first position indicator means comprising a plurality of parallel circumferential lines indicating the normal installation position of the expansion joint and the extremes in normal expansion and contraction of the joint when aligned with said second position indicator means.

8. An expansion joint as is defined in claim 1, wherein said first sleeve and said second sleeve are thermoplastic materials.

9. An expansion joint as is defined in claim 1, wherein position indicator means are located on said second sleeve visible through said first sleeve.

10. An expansion joint as is defined in claim 9, wherein said position indicator means is an O-ring.